United States Patent
Ogura et al.

(10) Patent No.: US 7,036,237 B2
(45) Date of Patent: May 2, 2006

(54) MEASURING INSTRUMENT

(75) Inventors: Katsuyuki Ogura, Utsunomiya (JP); Kenji Yamazaki, Utsunomiya (JP)

(73) Assignee: Mitutoyo Corporation, Kawasaki (JP)

( * ) Notice: Subject to any disclaimer, the term of this patent is extended or adjusted under 35 U.S.C. 154(b) by 34 days.

(21) Appl. No.: 10/864,747

(22) Filed: Jun. 9, 2004

(65) Prior Publication Data

US 2004/0250434 A1      Dec. 16, 2004

(30) Foreign Application Priority Data

Jun. 12, 2003      (JP)      ............................. 2003-167653

(51) Int. Cl.
*G01B 5/004*      (2006.01)
(52) U.S. Cl. ...................................... 33/503
(58) Field of Classification Search ................... 33/503, 33/1 M, 706, 707, 708, 549–555, 556, 558, 33/559, 561
See application file for complete search history.

(56) References Cited

U.S. PATENT DOCUMENTS

| | | | | |
|---|---|---|---|---|
| 4,908,950 A | * | 3/1990 | Band et al. | .................... 33/509 |
| 5,042,162 A | * | 8/1991 | Helms | .......................... 33/503 |
| 5,068,972 A | * | 12/1991 | Herzog et al. | ................. 33/503 |
| 6,000,671 A | | 12/1999 | Helms | |
| 6,272,760 B1 | | 8/2001 | Wiedmann et al. | |
| 6,829,838 B1 | * | 12/2004 | Weekers et al. | .............. 33/702 |

FOREIGN PATENT DOCUMENTS

| | | |
|---|---|---|
| DE | 27 59 759 C2 | 1/1982 |
| DE | 42 30 103 A1 | 6/1993 |
| DE | 101 47 614 A1 | 4/2002 |
| JP | 2000-65561 | 3/2000 |
| JP | 2002-86324 | 3/2002 |

* cited by examiner

*Primary Examiner*—Christopher W. Fulton
(74) *Attorney, Agent, or Firm*—Rankin, Hill, Porter & Clark LLP

(57) ABSTRACT

At least one assembly of a movable member or a guide member (32) that guides the movement of the movable member out of a plurality of assemblies of a measuring instrument contains a sealed space (322). A filler is filled in the sealed space (322). According to this arrangement, rigidity of the movable member or the guide member (32) can be enhanced. Further, residual vibration generated along with the movement of the movable body can efficiently be attenuated.

5 Claims, 5 Drawing Sheets

MEASURING INSTRUMENT

BACKGROUND OF THE INVENTION

1. Field of the Invention

The present invention relates to a measuring instrument. Particularly, the present invention relates to a measuring instrument that includes a plurality of assemblies, at least one assembly of which serves as a movable member or a guide member for supporting a movement of the movable member.

2. Description of Related Art

Conventionally, a coordinate measuring machine for measuring three dimensional data such as dimension and profile of a workpiece has been known (for example, see JP2000-65561A). In the above coordinate measuring machine, a probe and a table can relatively be moved in three axial-directions of X, Y and Z-axis directions being orthogonal each other to measure the three dimensional data such as the dimension and the profile of the workpiece based on a movement displacement amount of each axis when the probe contacts the workpiece set on the table.

Currently, the above coordinate measuring machine has been highly improved in measuring speed and measuring accuracy. However, with the measuring speed and the measuring accuracy highly improved, vibration generated when the probe and the table are relatively moved cannot be ignored. As a vibration attenuation mechanism for such vibration, a mechanism that actively attenuates the vibration by an elastic rubber or a spring etc. provided on a body of the coordinate measuring machine has been employed.

However, the vibration attenuation mechanism has the limitation of attenuating the vibration. Accordingly, a new method for attenuating the vibration has been desired in order to further highly improve speed and accuracy of the coordinate measuring machine.

Incidentally, a casting member having a rib therein is used for a guide that guides movement of the probe and for a table on which the workpiece is set, in order to secure rigidity and secular stability. When such casting member is cast, since the rib is formed with the use of a core, an opening is necessary to be provided on the casting member for removing core sand used at the casting, and the core sand is necessary to be removed from the casting member. Thus, there has been a disadvantage that the casting of the guide and the table need numerous steps, thus not efficiently producing the casting member.

SUMMARY OF THE INVENTION

An object of the present invention is to provide a measuring instrument that efficiently attenuates residual vibration accompanied with movement of a assembly, and highly improves both measuring speed and measuring accuracy. Another object of the present invention is to provide a measuring instrument that includes a assembly with high manufacturing efficiency.

A measuring instrument according to an aspect of the present invention, includes a plurality of assemblies, at least one assembly of which serves as a movable member or a guide member for supporting movement of the movable member, in which the assembly serving as the movable member or the guide member contains a sealed space, and in which a filler is filled in the space.

According to this arrangement, since the at least one assembly out of the assemblies of the movable member or the guide member which supports the movement of the movable member has the sealed space in which a filler is filled, rigidity and vibration attenuation ability can be enhanced as compared to a typical assembly with rib configuration. Specifically, by enhancing the rigidity, the generated residual vibration can be reduced, and by filling the filler in the sealed space, the generated residual vibration can quickly be attenuated. Accordingly, even when the measurement is performed after the residual vibration is attenuated for highly accurate measurement, the measurement standby time can be shortened, thus highly improving the measuring speed and the measuring accuracy.

A measuring instrument according to another aspect of the present invention, includes two columns approximately vertically provided, a horizontal beam approximately horizontally bridged between the columns, and a probe attached so as to be advanced and retracted along the horizontal beam, in which the horizontal beam contains a sealed space, and in which a filler is filled in the space.

According to the arrangement, the approximately same advantages as the above measuring instrument can be attained. Specifically, since the horizontal beam contains the sealed space with the filler being filled therein, the rigidity can be enhanced as compared to a horizontal beam formed with a assembly having typical rib configuration. Further, since the filler is filled therein, residual vibration generated when the probe is advanced and retracted can be attenuated more promptly. Accordingly, even when the measurement is performed after the residual vibration is attenuated for highly accurate measurement, the measurement standby time can be shortened, thus highly improving the measuring speed and the measuring accuracy.

Preferably, in the above measuring instrument, the horizontal beam is formed by a casting member with a rib.

According to this arrangement, since the horizontal beam includes the rib, the rigidity can further be enhanced in addition to the sealed space of the above-described horizontal beam. Further, when the filler with lighter mass than the casting member is used, the weight of the horizontal beam can be reduced as compared to a horizontal beam formed by a casting member to be substantially condensed. Furthermore, since the horizontal beam is formed by the casting member, the horizontal beam can be prevented from secular change, and secular stability of the probe being advanced and retracted can be secured.

A measuring instrument according to still another aspect of the present invention, includes a base, a guide member provided on the base, and a table guided by the guide member to slide on the base, in which the table contains a sealed space, and in which a filler is filled in the space.

According to this arrangement, the same advantages as the above-described measuring instrument and the horizontal beam can be attained. Specifically, since the table contains the sealed space with the filler being filled therein, the advantage of high rigidity can be attained as compared to a table having a plurality of recesses parceled by rib configuration at a bottom side thereof. Further, in addition to the this advantage, since the filler is filled in the sealed space, residual vibration generated when the table sliding can more promptly be attenuated. Accordingly, when the measurement is performed after the residual vibration is attenuated, the measurement standby time can be shortened, thus improving measuring speed and measuring accuracy.

Preferably, in the above measuring instrument, the space is formed at a part of the table opposite to the guide member.

According to this arrangement, since the sealed space of the table is formed at the part opposite to the guide member that guides the table sliding, the formation of the sealed space can be minimized to the amount required for attenuating the residual vibration. Accordingly, as compared to that the table is entirely sealed, the movement mass of the table can be reduced. Thus, the residual vibration generated along with the table sliding can be attenuated while the weight of the table can be reduced.

Preferably, in the above measuring instrument, the table is formed by a casting member with a rib at a bottom side thereof.

According to the arrangement, the same advantages as the above-described horizontal beam can be attained. In other words, since the table is formed by the casting member provided with the rib, the rigidity can further be enhanced in addition to the above-described sealed configuration. Further, when a filler having lighter mass than the casting member is filled in the sealed space of the table, the weight of the table can be reduced as compared to a table formed by a casting member to be substantially condensed. Furthermore, since the table is formed with the casting member, the secular change of the table can be restricted.

Preferably, in the above measuring instrument, the filler is core sand used for forming the space in casting of the casting member.

According to this arrangement, since the core sand used for the formation of the sealed space is filled in the sealed spaces of the horizontal beam and the table, a process for removing the core sand from the sealed spaces when the horizontal beam and the table are manufactured can be omitted. Accordingly, a process for filling another filler in the sealed spaces can be omitted. Thus, the manufacturing process of the horizontal beam and the table can be facilitated, consequently enhancing the manufacturing efficiency.

DETAILED DESCRIPTION OF PREFERRED EMBODIMENT(S)

An embodiment of the present invention will be described below with reference to the attached drawings.

Figure 1:
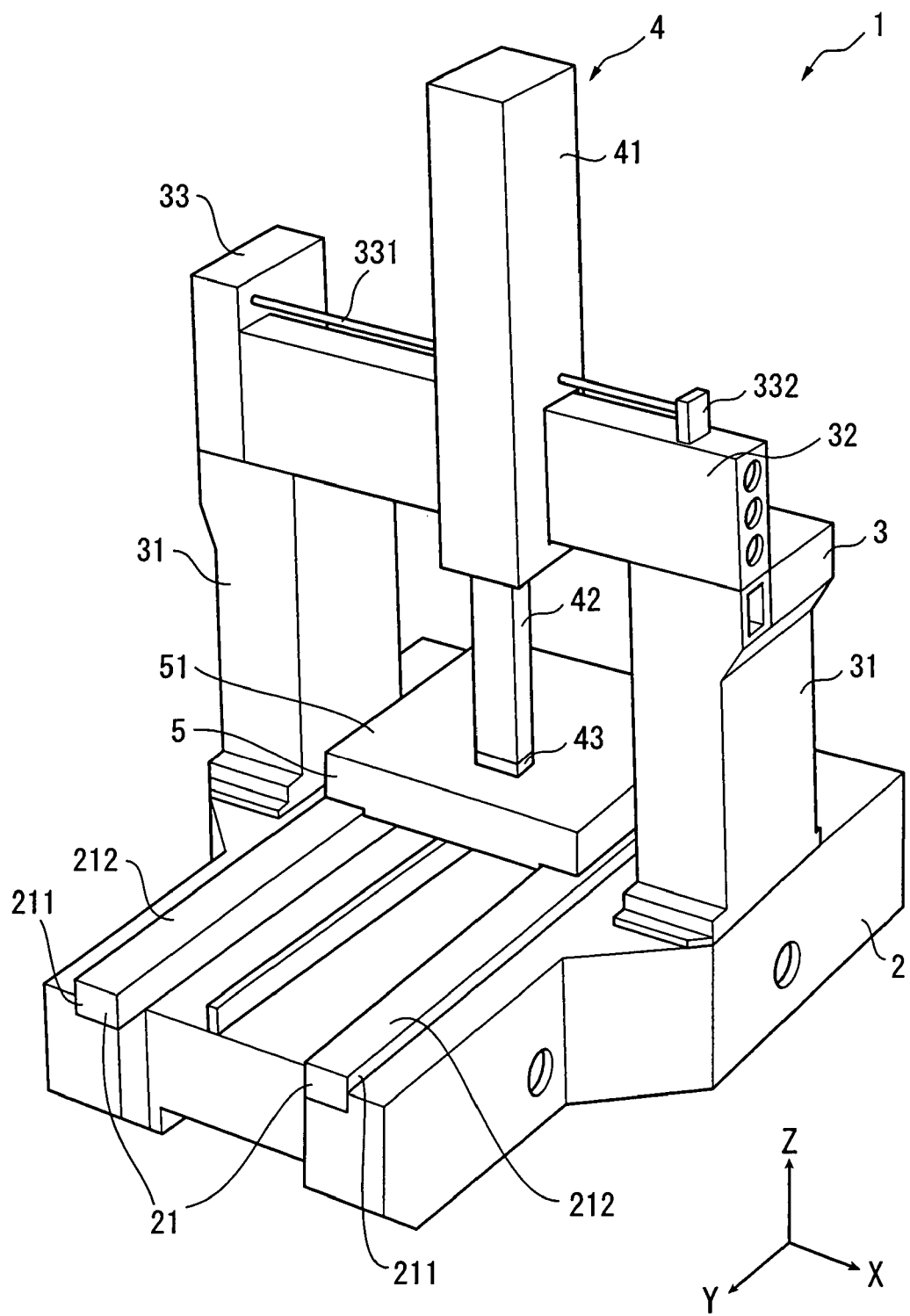
FIG. 1 is a perspective view showing a coordinate measuring machine according to an embodiment of the present invention.

FIG. 1 shows a coordinate measuring machine according to the present embodiment.

Referring to FIG. 1, a coordinate measuring machine 1 includes a base 2, a bridge type column 3, a slider 4 and a table 5.

The base 2, which is a base of the coordinate measuring machine 1, is made of a casting member. A Y-axis guide 21 is provided on an upper side of the base 2. The Y-axis guide 21 guides the table 5 sliding in a longitudinal direction of the coordinate measuring machine 1, i.e., in Y-axis direction as shown in FIG. 1 with a sign "Y". The Y-axis guide 21 includes rails 211, which are two substantially projected guide members formed along the longitudinal direction of the base 2 with being parallel to each other. A guide way 212 that guides the table 5 sliding is formed on each upper side of the rails 211.

The bridge type column 3 is vertically provided on the upper side of the base 2. The bridge type column 3, which advances and retracts the slider 4 in a width direction of the coordinate measuring machine 1, i.e., in X-axis direction as shown in FIG. 1 with a sign "X", includes two columns 31, an X-axis guide 32 and a slider driving mechanism 33.

The two columns 31, which define legs of the bridge type column 3, are approximately vertically provided on both ends of the upper side of the base 2 in the width direction at the approximately center in the longitudinal direction. The X-axis guide 32 as a horizontal beam approximately horizontally bridges between upper ends of the columns 31. The X-axis guide 32, which guides the slider 4 to be advanced and retracted in the X-axis direction, is made of an approximately rectangular casting member with a dimension in the width direction (X-axis direction) being longer than a dimension in a height direction (Z-axis direction). Incidentally, the configuration of the X-axis guide 32 will be described below in detail.

The slider driving mechanism 33 for advancing and retracting the slider 4 in the X-axis direction is provided on an upper side of the X-axis guide 32. The slider driving mechanism 33 includes a driving mechanism (not shown, e.g., a motor, a pulley or a belt), an X-axis guide shaft 331 and a fixing section 332. The X-axis guide shaft 331 transfers driving force from the driving mechanism to the slider 4 while the fixing section 332 supports the X-axis guide shaft 331 in a rotatable manner in an axial direction.

The slider 4 includes a probe (not shown) and advances and retracts the probe in the height direction, i.e., in the Z-axis direction as shown in FIG. 1 with a sign "Z". The slider 4 further includes a slider body 41, a spindle 42 and a probe head 43 in addition to the probe.

The slider body 41 is covered by a steel case. The spindle 42 is attached at a lower end of the slider body 41 together with the driving mechanism (not shown) so as to be advanced and retracted in the Z-axis direction. The probe head 43 for attaching the probe to the spindle 42 is provided at a tip end of the spindle 42. The probe head 43 is configured to be attached with various probes. Further, the probe head 43 itself is detachably attached in view of the replacement. Either contact type or non-contact type probe can be attached.

Figure 2:
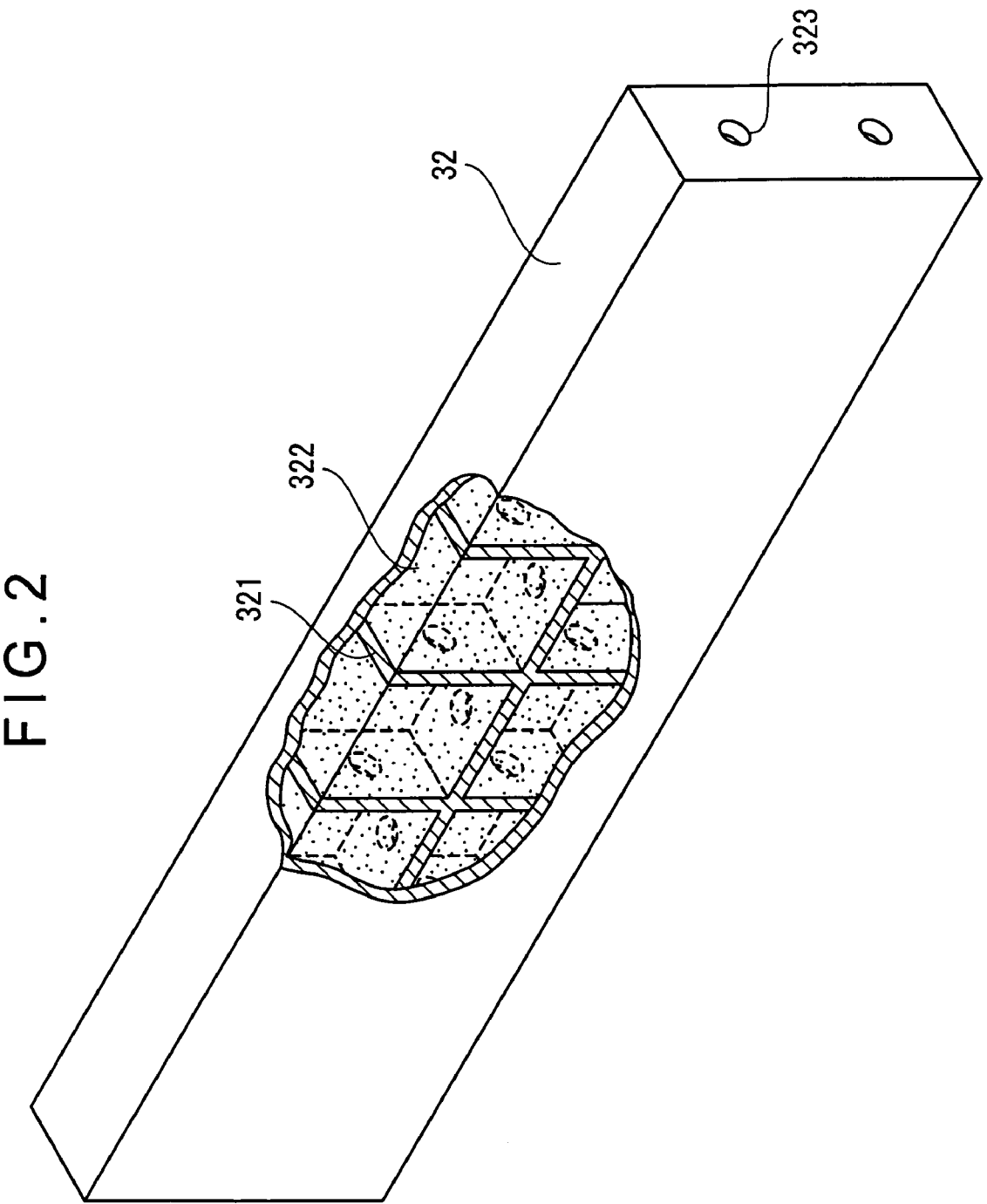
FIG. 2 is a perspective view showing an X-axis guide with being partially cutaway according to the embodiment.

FIG. 2 shows the configuration of the X-axis guide 32.

The X-axis guide 32 is made of a casting member as mentioned above, which is an entirely sealed assembly. A lattice-like rib 321 and a hollow space 322 parceled by the rib 321 are formed inside the X-axis guide 32.

The hollow space 322 is filled with core sand. The core sand is the one used when the hollow space 322 is formed at the casting process of the X-axis guide 32. Generally, the core sand used for forming the hollow space inside is removed at the casting of a typical casting member. However, the core sand is not removed at the casting of the X-axis guide 32 in the present embodiment. The X-axis guide 32 is sealed with the core sand being filled inside. In the casting process of the X-axis guide 32, a plug (not shown) is provided at a hole 323 into which a base board (a shaft) of the core sand has been inserted. The plug inhibits leaking of the core sand filled inside the X-axis guide 32 from the hole 323.

Figure 3:
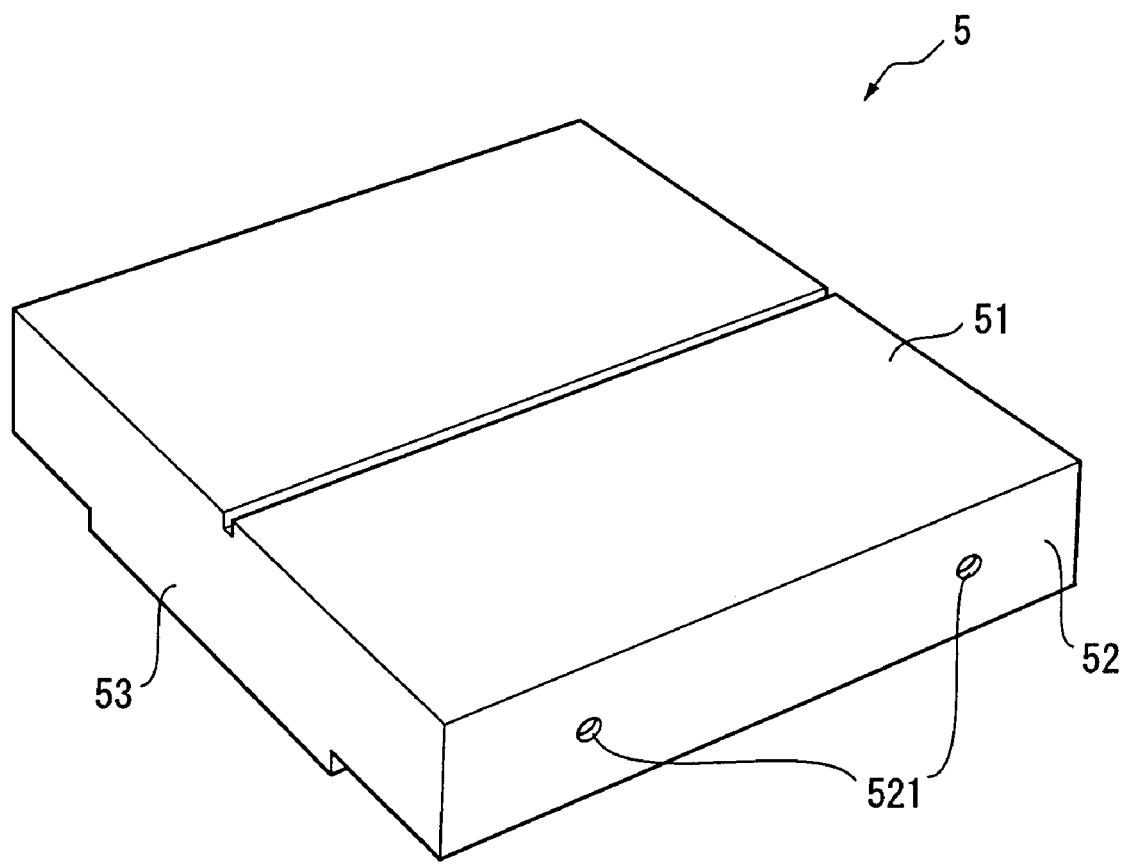
FIG. 3 is a perspective view showing a table according to the embodiment.

FIG. 3 shows the table 5.

As described above, the table 5 slides in the Y-axis direction along the Y-axis guide 21 formed on the base 2. The table 5 is an approximately rectangular casting member equipped with a rib (see FIG. 4) at a bottom side thereof, which is symmetrical configuration when seen from above. The table 5 includes a mount face 51 formed on an upper side of the table 5 so that a workpiece is set thereon, lateral sides 52 substantially drooping from both ends of the mount face 51 in the width direction (X-axis direction) and lateral sides 53 substantially drooping from both ends of the mount face 51 in the longitudinal direction (Y-axis direction).

A hole 521 closed with a plug (not shown) is provided on the lateral side 52. The same hole 521 is also provided on the side opposite to the lateral side 52 shown in FIG. 3. The hole 521 corresponds to the position of the base board of the core for forming the hollow space in the table 5 at the casting of the table 5. Generally, though the core sand is removed via the hole 521, the core sand is remained to be filled in the table 5 by closing the hole 521 according to the present embodiment.

The lateral side 53 is a face approximately orthogonal to the longitudinal direction (Y-axis direction) of the base 2 when the table 5 is placed on the base 2. The lateral side 53 is approximately T-shaped with the center part thereof extending downward.

Figure 4:
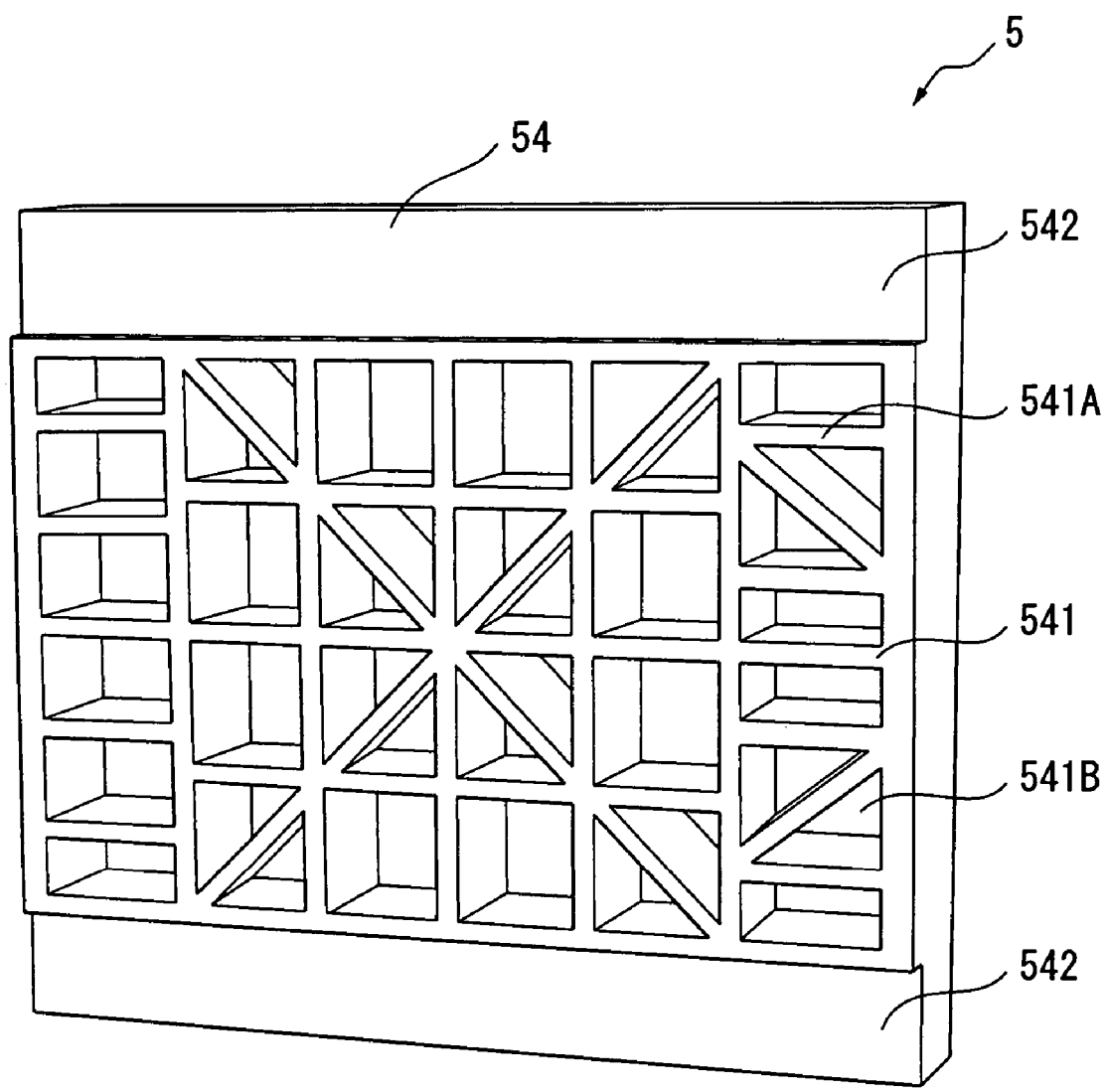
FIG. 4 is a perspective view showing a bottom side of the table according to the embodiment.

FIG. 4 shows a bottom side 54 of the table 5.

On the bottom side 54 of the table 5, a projection 541 formed at the center of the bottom side 54 and sealed sections 542 formed on both ends of the bottom side 54 so as to sandwich the projection 541 are provided.

The projection 541 projects downward when the table 5 is arranged on the base 2 to be interposed between the rails 211 of the Y-axis guide 21 formed on the base 2. With such arrangement, the swing of the table 5 while sliding is restricted. A lattice-like rib 541A is formed on the projection 541. A space 541B parceled by the rib 541A opens at the lower side thereof.

The sealed sections 542 are sealed spaces formed on the bottom side 54 at both ends in a direction approximately orthogonal to the Y-axis direction shown in FIG. 1, i.e., at both upper and lower ends as shown in FIG. 3. A rib and a hollow space (not shown) are formed inside the sealed section 542 in the same manner as the X-axis guide 32. The core sand for forming the hollow space at the casting of the table 5 is remained to be filled in the hollow space without being removed.

A lower side of the sealed section 542 is a face opposite to the guide way 212 of the Y-axis guide 21 formed on the base 2 when the table 5 is arranged on the base 2. An air bearing (not shown) is disposed on the lower side. Accordingly, the table 5 smoothly slides on the base 2 along the guide way 212 of the Y-axis guide 21.

In the present embodiment, the X-axis guide 32 is a sealed assembly which is entirely sealed, and the sealed space filled with the core sand is formed inside the X-axis guide 32. With this arrangement, rigidity can be enhanced as compared to an X-axis guide formed by a assembly with a rib configuration being exposed. Further, residual vibration generated when the slider 4 and the spindle 42 are advanced and retracted can be attenuated more promptly.

Figure 5A:
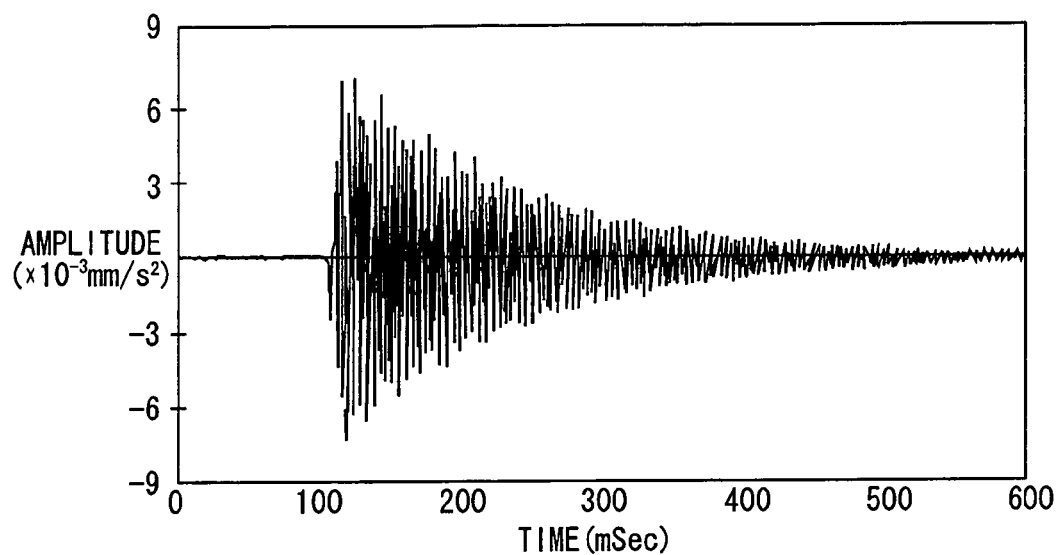
FIG. 5A is an illustration showing a vibration attenuation wave of a conventional coordinate measuring machine.
Figure 5B:
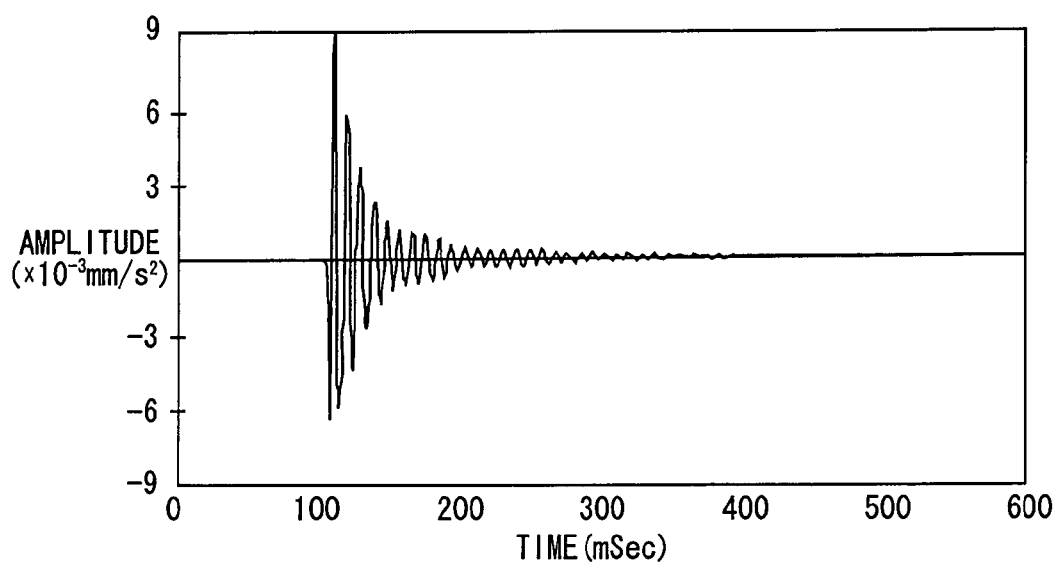
FIG. 5B is an illustration showing a vibration attenuation wave of the coordinate measuring machine according to the embodiment.

FIGS. 5A and 5B show vibration attenuation waves of sliders moving of a typical coordinate measuring machine and the coordinate measuring machine of the present embodiment. FIG. 5A shows the vibration attenuation wave of the typical coordinate measuring machine with the use of an X-axis guide formed by a casting member without a filler being filled. FIG. 5B shows the vibration attenuation wave of the coordinate measuring machine according to the present embodiment.

Referring to FIG. 5A, the typical coordinate measuring machine takes about 300 mSec for attenuating the generated vibration to be one-tenth amplitude of the maximum amplitude. On the other hand, referring to FIG. 5B, the coordinate measuring machine of the present embodiment only takes about 50 mSec for attenuating the generated vibration to be one-tenth amplitude of the maximum amplitude.

Accordingly, the coordinate measuring machine of the present embodiment can extremely shorten the time required to settle the residual vibration as compared to the typical coordinate measuring machine. Thus, even when the measurement is performed after the vibration is settled for highly accurate measurement, measurement standby time can be shortened, thereby improving both measuring speed and measuring accuracy.

Since the X-axis guide 32 includes the rib 321 therein, rigidity can further be enhanced in addition to the sealed configuration of the above-described X-axis guide 32. Further, since the core sand is used as the filler, the weight of the X-axis guide 32 is reduced as compared to an X-axis guide formed by a casting member to be substantially condensed. Furthermore, since the X-axis guide 32 is formed by the casting member, secular change of the X-axis guide 32 can be restricted. Thus, stability of the slider 4 to be advanced and retracted can be secured during secular use.

Since the sealed section 542 filled with the core sand inside is formed in the table 5, rigidity of the table 5 can be enhanced as compared to a table without a sealed space. In addition to the above advantage, since the core sand is filled in the sealed space, the same advantages as the above-described X-axis guide 32 can be obtained. Specifically, the residual vibration generated when the table 5 sliding can be attenuated more promptly as compared to a table not having a sealed configuration or a table having a sealed configuration without a filler such as the core sand not being filled. Accordingly, both measuring speed and measuring accuracy can be enhanced.

Since the sealed section 542 of the table 5 includes the rib configuration (not shown), rigidity can further be enhanced together with the above-described sealed configuration. Since the core sand which has lighter mass than the casting member is used as the filler, the weight of the table 5 can be reduced as compared to a table formed by a casting member to be substantially condensed. Further, since the table 5 is formed by the casting member, the secular change of the table 5 can be restricted.

Since the sealed sections 542 of the table 5 are formed on the both ends of the table 5 opposite to the guide way 212, the formation of the sealed space can be minimized to the amount required for attenuating the residual vibration. Accordingly, since the movement mass of the table 5 can be reduced as compared to that the table 5 is entirely sealed, the residual vibration generated along with the table 5 sliding can be attenuated while the weight of the table 5 can be reduced.

Since the core sand is remained to be filled inside the hollow space 322 of the X-axis guide 32 and the sealed section 542 of the table 5, the core sand is not required to be removed from the hollow space 322 and the sealed section 542. With such arrangement, there is no need to fill any other filler in the respective members. Thus, the manufacturing step of the X-axis guide 32 and the table 5 can be facilitated and the manufacturing efficiency can be enhanced.

The present invention is not limited to the above-described embodiment, but includes modifications and improvements as long as objects of the present invention can be achieved.

In the above embodiment, though the coordinate measuring machine is exemplified, the present invention is not limited thereto. For example, the present invention can be applied to a measuring instrument for measuring roll diameter and profile, a surface roughness measuring instrument for measuring surface roughness, a surface roughness and contour profile measuring instrument, a profile measuring instrument for measuring profile, a roundness and cylindrical profile measuring instrument or the like. Namely, the present invention can be applied to a measuring instrument that includes a movable member and a guide member.

In the above embodiment, though the core sand is exemplified as the filler, the present invention is not limited thereto. Granular substance such as metal may be filled to attenuate the residual vibration when the assembly sliding.

In the above embodiment, while the hole 323 of the X-axis guide 32 and the hole 521 of the table 5 are closed with plugs, the holes can be closed with a plate body etc. Alternatively, the present invention may not be provided with the holes without the holes being manufactured at each manufacturing step, but may be sealed. When the holes 323 and 521 are closed with the plugs, the holes 323 and 521 can easily be closed after the X-axis guide 32 and the table 5 has been manufactured.

In the above embodiment, though the lateral side 53 of the table 5 is approximately T-shaped, the present invention is not limited thereto. The lateral side 53 only requires to have at least a recess opening toward the lower side as far as the profile of the lateral side 53 allows the table 5 sliding along the Y-axis guide 21. In this case, a following configuration is conceivable that the rail 211 is engaged with the opening recess to guide the table 5 sliding.

In the above embodiment, while the base 2, the table 5 and the X-axis guide 32 are made of the casting members, they may be made of steel member, granite or the like. In this case, the base 2, the table 5 and the X-axis guide 32 may be formed in a box shape so that granular substance such as sand or metal is filled thereinto. Incidentally, since the base 2, the table 5 and the X-axis guide 32 are made of the casting member, the core sand used at the casting of each member can be utilized as a filler, thus enhancing manufacturing efficiency of each member. Further, since the casting member is hardly deformed due to secular use, each member can be prevented from deforming on account of secular use, and additionally, secular stability of the slider 4 and the table 5 sliding can be secured.

In the above embodiment, while the sealed sections 542 of the table 5 are formed on the both ends of the bottom side 54 in the width direction (X-axis direction), the sealed sections 542 can be formed on both ends thereof in the longitudinal direction (Y-axis direction). Alternatively, the table 5 can entirely be arranged by a sealed casting member according to the present invention. Note that, since the sealed sections 542 are formed on the both ends of the bottom side 54 in the width direction, the residual vibration is effectively restricted along with the table 5 sliding while the weight of the table 5 can be reduced.

In the above embodiment, though the measurement of the workpiece in the Y-axis direction is performed by sliding the table 5 on which the workpiece is set in the Y-axis direction, the present invention is not limited thereto. For example, the measurement can be performed by the bridge type column 3 sliding in the Y-axis direction with the table 5 being fixed. In this case, the bridge type column 3 requires to slide along the Y-axis guide 21 provided on the base 2. The Y-axis guide 21 may be arranged by a sealed casting member. Alternatively, the base 2 itself can be arranged by a sealed casting member. Note that, since the table 5 is advanced and retracted in the Y-axis direction, vibration and error at the measurement can be restricted as compared to that the bridge type column 3 which has greater mass is advanced and retracted.

In the above embodiment, though the coordinate measuring machine 1 includes the bridge type column 3, a coordinate measuring machine that includes a column of single arm can be applied to the present invention.

In the above embodiment, the coordinate measuring machine 1 may be connected to a computer etc., and may be controlled by the computer etc. so that the measurement of the workpiece can be controlled.

What is claimed is:

1. A measuring instrument comprising a plurality of assemblies, at least one assembly of which serves as a movable member or a guide member for supporting movement of the movable member,
    wherein the assembly serving as the movable member or the guide member contains a sealed space, and
    wherein a filler is filled in the space,
    wherein the assembly serving as the movable member or the guide member is formed by a casting member with a rib, and
    wherein the filler is core sand used for forming the space in casting of the casting member.

2. A measuring instrument that includes two columns approximately vertically provided, a horizontal beam approximately horizontally bridged between the columns, and a probe attached so as to be advanced and retracted along the horizontal beam,
    wherein the horizontal beam contains a sealed space, and
    wherein a filler is filled in the space
    wherein the horizontal beam is formed by a casting member with a rib, and
    wherein the filler is core sand used for forming the space in casting of the casting member.

3. A measuring instrument that includes a base, a guide member provided on the base, and a table guided by the guide member to slide on the base,
    wherein the table contains a sealed space, and
    wherein a filler is filled in the spaces,
    wherein the table is formed by a casting member with a rib, and
    wherein the filler is core sand used for forming the space in casting of the casting member.

4. The measuring instrument according to claim 3, wherein the space is formed at a part of the table opposite to the guide member.

5. The measuring instrument according to claim 3, wherein the table has a rib at a bottom side thereof.

* * * * *